(12) United States Patent
Arvag

(10) Patent No.: US 11,358,535 B2
(45) Date of Patent: Jun. 14, 2022

(54) ATTACHMENT SYSTEM

(71) Applicant: Iver Arvag, Ostersund (SE)

(72) Inventor: Iver Arvag, Ostersund (SE)

( * ) Notice: Subject to any disclaimer, the term of this patent is extended or adjusted under 35 U.S.C. 154(b) by 109 days.

(21) Appl. No.: 16/432,117

(22) Filed: Jun. 5, 2019

(65) Prior Publication Data

US 2020/0384927 A1 Dec. 10, 2020

(51) Int. Cl.
*B60R 11/00* (2006.01)
*E01H 5/06* (2006.01)

(52) U.S. Cl.
CPC ....... *B60R 11/00* (2013.01); *B60R 2011/0049* (2013.01); *E01H 5/06* (2013.01)

(58) Field of Classification Search
CPC .......... B60D 1/485; B60D 1/488; B60D 1/52; B60D 1/48; B60D 1/01; B60D 1/07; B60D 1/075; B60D 1/14; B60D 1/145; B60D 1/565; B60D 1/56; B60R 11/00; B60R 2011/0049; B60R 2011/0052; B60R 2011/005; B60P 3/12; E01C 23/16; E01H 5/06; E01H 5/061–063; B66C 2700/0378; B66C 23/36; Y10T 403/3933; Y10T 403/3986; H02B 1/044; F16M 7/00; F16B 2/065; F16B 7/18; F16B 7/182; F16B 13/00; F16B 13/045; F16B 2013/009; F16B 13/04; F16B 2013/10; F16B 5/0642; F16B 2200/0403
USPC ...................... 280/495–496, 491.5; 224/545; 403/252–264; 248/56, 231.9, 231.91, 248/27.1
See application file for complete search history.

(56) References Cited

U.S. PATENT DOCUMENTS

| | | | | |
|---|---|---|---|---|
| 2,365,372 | A * | 12/1944 | Allen | F16B 9/054 248/501 |
| 4,834,601 | A * | 5/1989 | Schaap | F16B 13/00 411/173 |
| 5,102,156 | A | 4/1992 | Fink et al. | |
| 5,683,215 | A * | 11/1997 | Gaignard | F16F 1/3732 411/34 |
| 5,924,208 | A * | 7/1999 | Saeki | B23D 61/10 30/388 |
| 7,077,417 | B2 * | 7/2006 | Shoemaker | B60D 1/155 280/504 |

(Continued)

OTHER PUBLICATIONS

Office Action for U.S. Appl. No. 16/809,875 dated Mar. 19, 2021.

*Primary Examiner* — Ingrid M Weinhold
(74) *Attorney, Agent, or Firm* — Harness, Dickey & Pierce, P.L.C.

(57) ABSTRACT

An attachment system is provided for attaching an external component to a chassis of a vehicle, such as components for performing snow clearance, road measurements, road surface marking assemblies, transport of vehicles or gear, including salvaging work and transport of heavy duty vehicles. The attachment system includes at least an elongated chassis coupler element, a fastening mechanism for fastening the chassis coupler element to the chassis when in a mounted position, a distance element, and a clamping mechanism. The coupler element is shaped to fit inside a hollow space of the distance element, and the clamping mechanism is operable to control an insertion length of the coupler element into the hollow space thereby controlling the clamping of the distance element and the chassis when the attachment device is in a mounted position.

17 Claims, 4 Drawing Sheets

(56) References Cited

U.S. PATENT DOCUMENTS

| | | | |
|---|---|---|---|
| 8,540,198 B2* | 9/2013 | Keyvanloo | A47F 5/0823 |
| | | | 248/222.51 |
| 9,151,352 B2* | 10/2015 | Mayr | F16F 15/08 |
| 9,579,941 B2 | 2/2017 | Arvag | |
| 9,738,126 B2 | 8/2017 | Mantovani | |
| 9,914,332 B2 | 3/2018 | Jordan | |
| 2010/0284760 A1* | 11/2010 | Rotolo | F16B 19/1081 |
| | | | 411/44 |
| 2013/0056959 A1 | 3/2013 | Mathes et al. | |
| 2015/0352914 A1 | 12/2015 | Arvag | |
| 2016/0311281 A1 | 10/2016 | Mantovani | |
| 2020/0224690 A1* | 7/2020 | Voss | F16B 5/0642 |

* cited by examiner

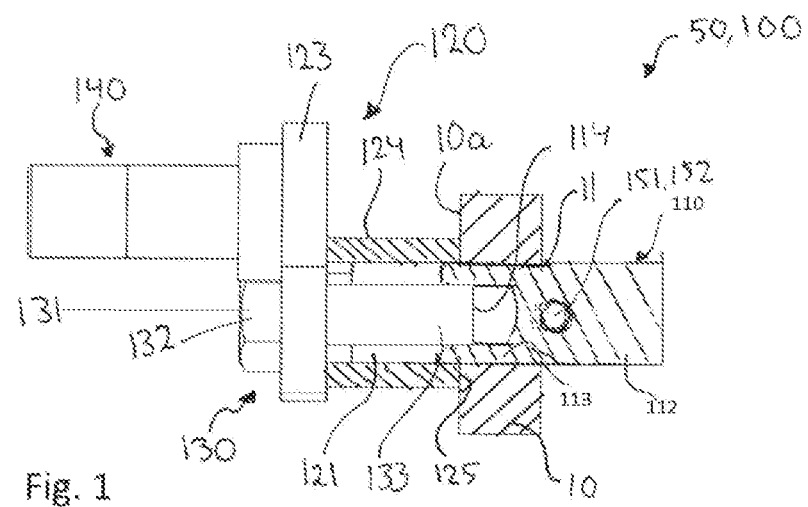
Fig. 1
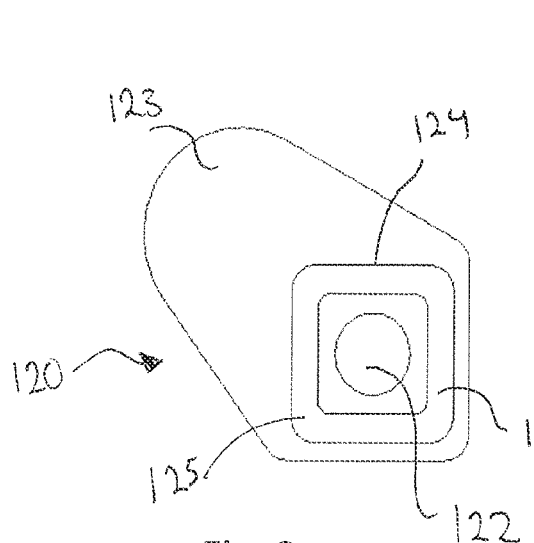
Fig. 2a                    Fig. 2b

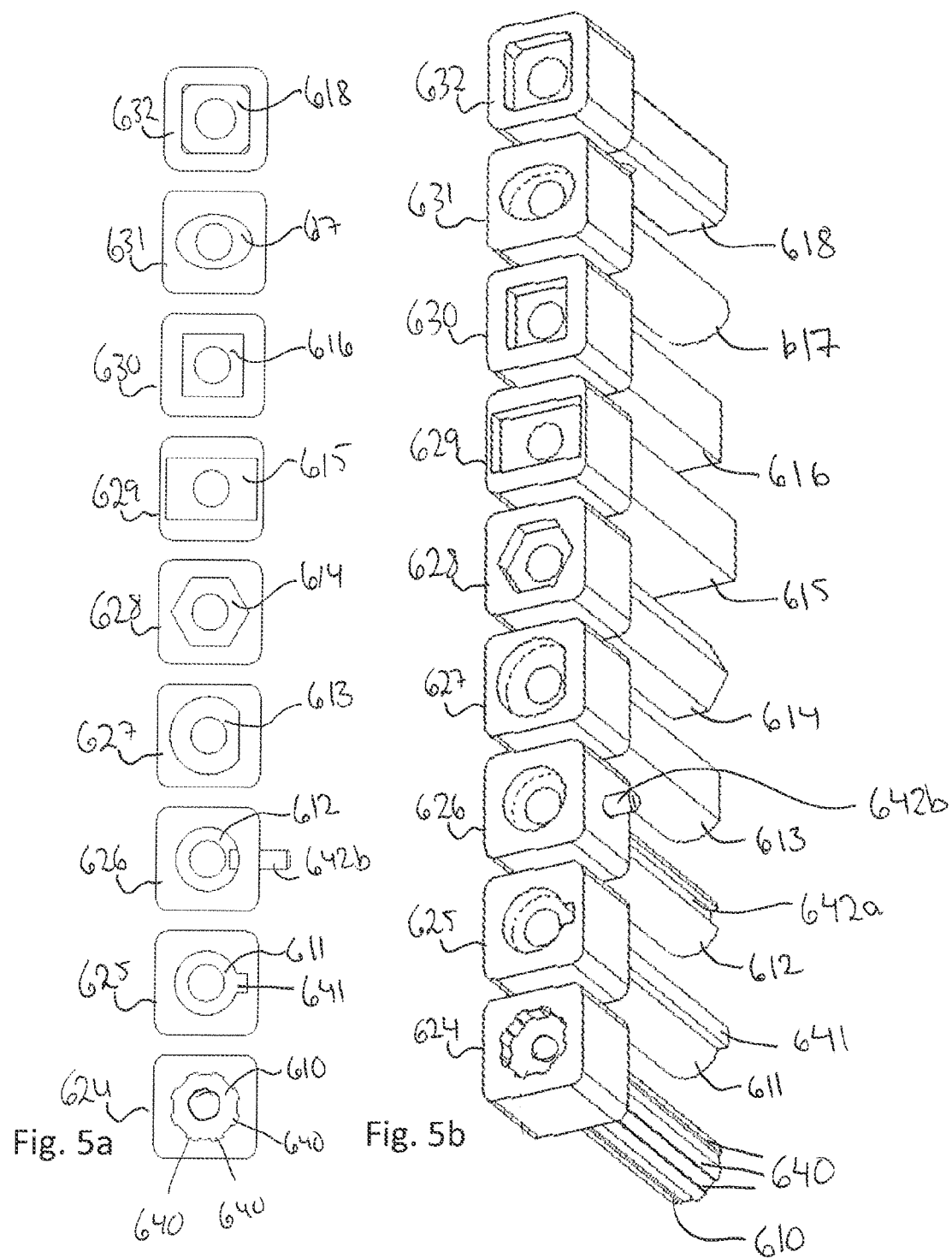

ATTACHMENT SYSTEM

FIELD OF THE INVENTION

The present invention generally relates to an attachment system for attaching an external component to a chassis of a vehicle.

BACKGROUND OF THE INVENTION

Various attachment systems for attaching external components to vehicles for e.g. salvaging operations, transport of the vehicle or of gear, snow clearance, road measurements, road surface marking assemblies and such are known. As an example, a salvaging device for a traditional heavy duty truck is secured to a front chassis frame of the truck, and may consists of a lifting belt or elevating chain secured to an attachment system consisting of a couple of tow rings which are engaged by means of a respective screw joint formed with receiving connection means in the front chassis frame. The tow rings typically project through a bumper of the vehicle, to provide points of attachments for the salvaging device, which accordingly interconnect the two tow rings. An interconnecting linkage may be arranged at a mid-section of the lifting belt in order to provide a terminal post for a hook, which is suspended from a lifting device or a towing device, for salvaging, lifting or towing of the truck. Salvaging of heavy duty vehicles puts stiff demand on the used towing gear and mode of procedure during the salvaging operation, as incorrect salvaging can cause an even greater damage on the vehicle as compared to any damage present initial to the salvaging operation. For extremely heavy vehicles, so called heavy duty wrecker trucks are used for salvaging operations. Wrecker trucks are equipped with lifting jacks with a capacity of over 30 tons. In addition, these trucks are often equipped with a lifting beam for towing/hauling wrecked or defect vehicles to a garage or to a scrap yard, where the lifting beam has a capacity of over 20 tons. This kind of equipment allows the wrecker truck to perform salvaging operations on both busses and transport lorries. The salvaging operation comprises performing lifting and/or hauling/towing operations on the vehicle. The salvaging operations are many times performed while applying highly asymmetrical forces on the connection means, i.e. the attachment system, of the vehicle being salvaged, and consequently on the chassis frame of the vehicle being salvaged.

DISCLOSURE OF INVENTION

One object of the invention is to provide an improved attachment system comprising a chassis coupler element which is arranged to in a simple and safe manner be mountable to a vehicle chassis and to attach to an external component of a vehicle, and which attachment system is arranged to minimize and be resistant to turning or torsional forces caused by distributed asymmetric forces acting on the chassis of the vehicle during salvaging operations (or other work with external components, like e.g. snow clearance equipment) and thereby to decrease the risk of damaging the chassis frame of the vehicle during the performed work. This object is achieved by the attachment arrangement according to the independent claim 1.

In accordance with a first aspect of the invention, an attachment system for attaching an external component to a chassis of a vehicle is provided which comprises at least one attachment device, which comprises an elongated chassis coupler element, a fastening mechanism for fastening a first end portion of the chassis coupler element to the chassis when in a mounted position, a distance element, and a clamping mechanism. An opposite second end portion of the coupler element is shaped to fit, i.e. be received, inside a hollow space of the distance element, preferably in a clearance fit. The clamping mechanism is arranged to (optionally releasably) engage the second end portion of the chassis coupler element and to be operable to control an insertion length of the second end portion into the hollow space thereby controlling the clamping of the distance element and the chassis when the attachment device is in a mounted position.

An attachment system is thereby achieved which has one or more attachment devices for attaching an external component to a chassis of a vehicle. Each attachment device, when mounted, has a collar portion (formed by the hollow space of the distance element) that encompasses a portion of the chassis coupler element, and an edge side area of the collar portion that bears against an outer surface of the chassis/beam element. As the clamping mechanism is operated the clamping pressure between the edge side and the chassis is advantageously controlled and a rigid connection is achieved. This is advantageous to distribute forces acting on the attachment device in a radial direction, e.g. when performing an asymmetric salvaging operation, and to counteract any loosening between the pull stud and the connecting means of the chassis. By increasing the edge side area of the collar portion, e.g. by adding a flange, lateral/radial sturdiness of the rigid connection is increased even more.

According to an embodiment of the attachment system, at least a portion of the first end portion of the attachment device is shaped to fit in a corresponding mounting opening, preferably in a clearance fit, of the chassis/beam to form a rigid connection.

According to an embodiment of the attachment system, a cross-section of at least a portion of the second end portion and a corresponding cross-section of the hollow space of the distance element are selected to prevent mutual rotation of the chassis coupler element and the distance element about the long axis of the chassis coupler element.

According to an embodiment of the attachment system, at least a portion of the first end portion of the attachment device is shaped to fit in a corresponding mounting opening of the chassis, and wherein the cross-sections of the portion of the first end portion and the corresponding mounting opening are selected to prevent rotation of the chassis coupler element about the long axis of the chassis coupler element.

According to an embodiment of the attachment system, the clamping mechanism is arranged by means of a screw joint, a bolt joint, or a stud joint.

According to an embodiment of the attachment system, the first end portion has a cross-section shape that contains or misses at least one portion that separates the cross-section shape from a circle, i.e. that excludes a circular shape, such that the first end portion is prevented from rotating about its long axis when inserted inside a correspondingly shaped mounting opening of the chassis. The cross-section shape may for instance be selected as a regular or irregular polygon, e.g. one of a rectangle, square, ellipse, a sector of a circle, diamond, rhombic, triangle, polygon, star, t-shape etc. such that the coupler element cannot rotate about its long axis inside the mounting opening. As appreciated by a person skilled in the art other shapes of the cross-section, excluded from a circular shape, are applicable.

According to an embodiment of the attachment system, the second end portion has a cross-section shape that contains at least one portion that separates the cross-section shape from a circle, i.e. that excludes a circle shape, such that the first end portion is prevented from rotating about its long axis when inserted inside the correspondingly shaped hollow distance element. The cross-section shape may for instance be selected as a regular or irregular polygon, e.g. one of a rectangle, square, ellipse, a sector of a circle, diamond, rhombic, triangle, polygon, star, t-shape etc. such that the coupler element cannot rotate about its long axis inside the mounting opening. As appreciated by a person skilled in the art other shapes of the cross-section, excluded from a circular shape, are applicable.

According to an embodiment of the attachment system, the fastening mechanism comprises a retainer pin and the first end portion is arranged having an anchor opening, such that the first end portion is affixed to the chassis by means of the retainer pin to hold the first end portion stationary with respect to the chassis/beam. Optionally, the retainer pin is inserted through the anchor opening and corresponding openings in the chassis to attach the coupler element to the chassis.

According to an embodiment of the attachment system, in which at least a portion of the second end portion is cylinder shaped, i.e. has a cross section that is circular, the fastening mechanism is arranged by the first end portion having a threaded portion for connecting to a corresponding threaded portion inside the mounting opening. In addition, the first end portion may also comprise a guiding portion. The guiding portion may comprise a cone-shaped cylinder portion.

According to an embodiment of the attachment system, the fastening mechanism comprises a key portion, e.g. T-, L-F, E shaped, arranged on the first end portion. The mounting opening of the chassis/beam is then preferably arranged having a corresponding complementary key hole to hold the first end portion stationary, and preferably with a predetermined angular position, with respect to the chassis/beam.

According to an embodiment of the attachment system, it further comprises a connection element for interconnecting with the external component.

According to an embodiment of the attachment system, the connection element is eccentrically positioned with respect to long axis of the chassis coupler element.

According to an embodiment of the attachment system, the connection element is arranged in/attached to the clamping mechanism. For instance, a ring shaped connector element for connecting the external component may be arranged on top of the screw head of a screw joint forming the clamping mechanism.

According to an embodiment of the attachment system it comprises two attachment devices and a horizontally elongated crossbar which is arranged for interconnecting the two attachment devices.

According to an embodiment of the attachment system, the crossbar is detachably arranged.

According to an embodiment of the attachment system, the external component is one of a salvaging means, a snow plough, support element for a crane, a measuring gear, and a road surface marking assembly.

BRIEF DESCRIPTION OF THE DRAWINGS

This and other aspects of the present invention will now be described in more detail, with reference to the appended drawings showing non limiting embodiment(s) of the invention. Corresponding components in the embodiments have the same reference number.

FIG. 1 is a schematic partly cross-sectional side view of an embodiment of an attachment device according to the present invention;

FIG. 2a is a first side view of an embodiment of a distance element according to the invention, and FIG. 2b is a second side view of the same distance element;

FIG. 5a shows schematic top views of cut open illustrations of various different chassis coupler elements and collar shaped portions according to the present inventive concept, and FIG. 5b shows perspective side views of cut open illustrations of the same various different chassis coupler elements and collar shaped portions according to the present inventive concept as shown in FIG. 5a.

DETAILED DESCRIPTION

The present invention is exemplified herein under with embodiments of an attachment system for attaching an external component to a chassis of a heavy duty vehicle. The term salvaging means should be understood as equipment for salvaging/pulling up vehicles from ditches or from being stuck in mud or snow, and for transporting damaged/defect vehicles to a garage. It is understood however that the attachment system according to the present invention is applicable for securing other types of external components such as a snow plough, support element for a crane, a measuring gear, and a road surface marking assembly etc.

Figure 3:
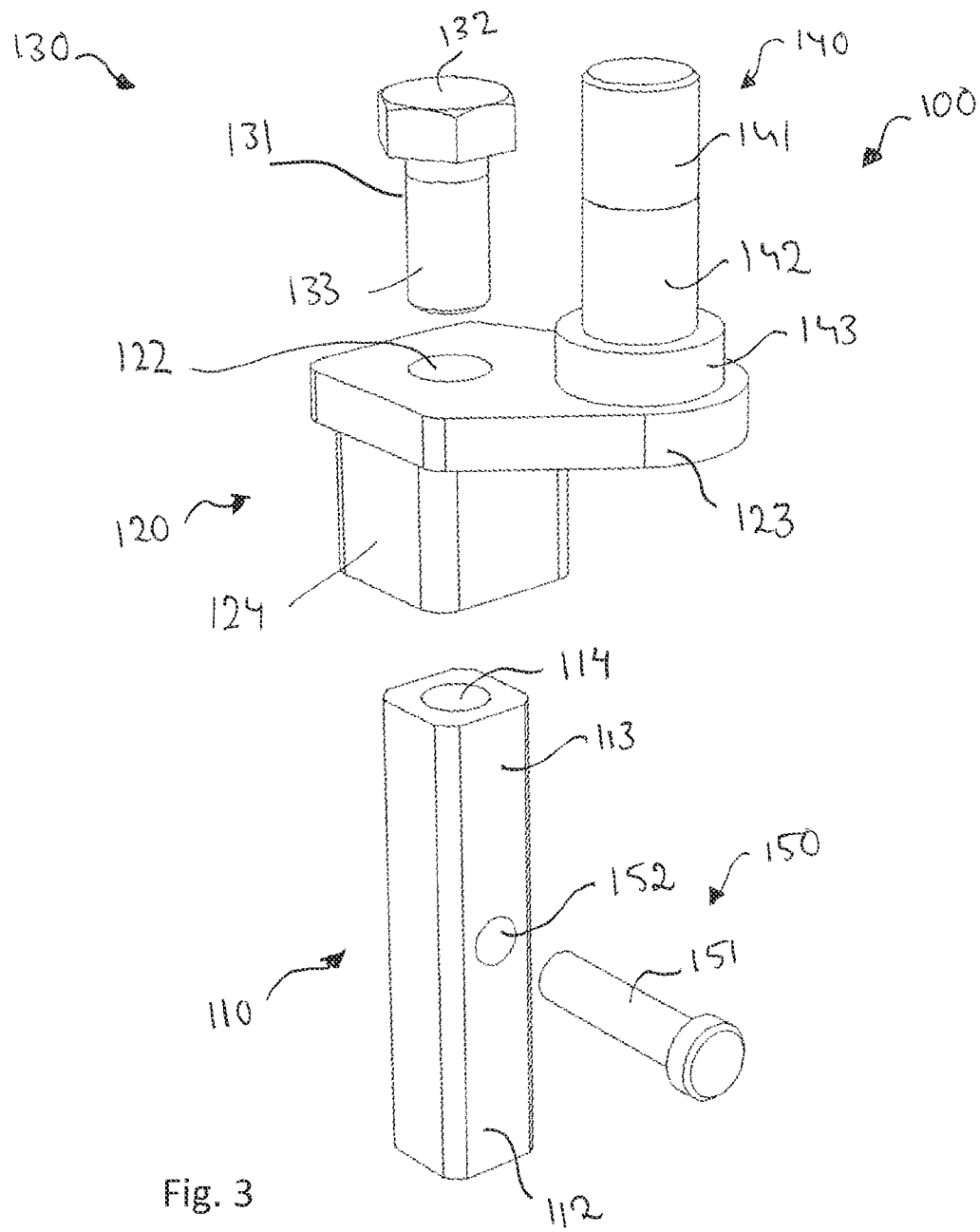
FIG. 3 is an exploded schematic perspective side view of the embodiment of the attachment device shown in FIG. 1.

With reference to FIGS. 1 to 3, an attachment system 50, for attaching an external component (not shown) to a chassis 10 of a vehicle, according to the invention includes at least one attachment device 100 which is designed to provide a rigid connection with the chassis 10 and to provide a connection element 140 arranged for connecting the external component to the chassis. The attachment device 100 is illustrated in more detail in the exploded view in FIG. 3. The shown attachment device 100 comprises an elongated chassis coupler element 110 with a first end portion 112 and an opposite second end portion 113, and a fastening mechanism 150 for fastening the first end portion 112 of the chassis coupler element 110 to the chassis 10 when in a mounted position. The attachment device 100 further comprises a distance element 120 which has a substantially collar shaped portion 124 with a hollow space 121 which is open in a direction facing the chassis 10 and adapted to receive the second end portion 113 of the chassis coupler element 110 when in a mounted position, and has a support plate 123 which closes the hollow space 121 in a direction not facing the chassis when in a mounted position. The support plate 123 is further arranged having a support plate opening 122 which is centered with respect to the long axis of the chassis coupler element 110. The second end portion 113 of the coupler element is shaped to fit inside the hollow space 121 of the distance element 120, preferably in a clearance fit. That is, the cross section of the hollow space 121 and the cross section of the second end portion 113 of the chassis coupler element 110 match with a clearance fit.

The attachment device 100 further comprises a clamping mechanism 130 which in the exemplifying embodiment is arranged by a bolt screw 131 inserted through the support plate opening 122 and engaging with an inner threaded centered opening 114 arranged in the second end portion 113 of the chassis coupler element 110. Other clamping mechanisms which controls the insertion length of the chassis coupler element end portion into the collar shaped portion of the distance element are conceivable. For example, in an alternative embodiment a threaded cylindrical portion is arranged on top of the second end portion of the chassis coupler element which in a mounted position is arranged to protrude through the support plate opening and tightened by means of a bolt (not shown).

With reference again now to FIG. 1 in which the attachment device 100 is shown mounted to the chassis 10, the first end portion 112 is inserted in a receiving mounting opening 11 the chassis 10 and locked in position with the fastening mechanism 150 here arranged with a retainer pin 151 and a complementary anchor opening 152 arranged in the first end portion 112 of the chassis coupler element 110. Alternatively, when the chassis is thicker the retainer pin 151 is inserted through the anchor opening 152 and corresponding openings in the chassis to attach the chassis coupler element to the chassis (not shown). In the shown exemplifying embodiment, the chassis coupler element is long as compared to the thickness of the chassis 10, and to fit to the chassis, the first end portion 112 extends substantially into a mid-section of the chassis coupler element, however a shorter chassis coupler element is conceivable, i.e. where the first end portion 112 is limited to the end of the chassis coupler element.

At least a portion of the first end portion 112 of the attachment device is shaped to fit in the corresponding mounting opening 11 of the chassis, preferably in a clearance fit.

As previously explained, when the system is mounted, clamping of the attachment device 100 and chassis 10 is provided by the following procedure which is now explained in more detail:

After the first end portion 112 is secured to the chassis, the distance element 120 is put over the second end portion 113 which is thus received by the hollow space 121. Subsequently, the bolt 131 is inserted through the support plate opening 122 to let the threaded portion 133 engage with the threaded opening 114 of the second end portion 113. By operating (tightening) the bolt screw 131 the chassis coupler element 110 is in a controlled manner further inserted into the hollow space 121 thereby tightening the connection between the distance element 120 and the chassis 10. An edge side area 125, shown in more detail in FIG. 2a, of the collar shaped portion 124 of the distance element 120 bears against an outer surface 10a of the chassis 10. The clamping mechanism is thus arranged to clamp the attachment device 100 and chassis 10 by being operable to control an insertion length of the (second end portion of the) chassis coupler element into the hollow space thereby controlling the clamping of the distance element and the chassis when the attachment device is in a mounted position.

According to embodiments of the attachment system, the shape of the first end portion and in the same manner the second end portion of the chassis coupler element may be selected from a variety of shapes. In a preferred embodiment, and as illustrated in FIGS. 1-4, the shape of (cross-sections of) first and second end portions, 112 and 113, are selected to be received by the mounting opening 11 of the chassis and the hollow space 121, respectively, in a clearance fit. The shapes of (cross-sections of) the first end portion 112, the second end portion 113, the mounting opening 11 and the hollow space 121 are here selected to be a regular octagon (square with cut corners), which is advantageous as the formed rigid connection is sturdy and highly reduces the risk of the attachment device rotating about its long axis even when the attachment device is subjected to heavy asymmetrical loads as may be the case when e.g. salvaging a tilted heavy duty vehicle from a ditch. It is advantageous to select a cross-section shape that contains at least one portion that separates the cross-section shape from a circle and thus prevents a rotation of the parts of the attachment device about the long axis of the chassis coupler element, which is illustrated in FIG. 5a, which shows top views of cut open illustrations of various different chassis coupler elements 610-618 and collar shaped portions 624-632 according to the present inventive concept, and FIG. 5b which shows perspective side views of cut open illustrations of the same various different chassis coupler elements 610-618 and collar shaped portions 624-632 according to the present inventive concept as shown in FIG. 5a. Note that each illustrated chassis coupler element 610-618 and corresponding receiving openings (hollow space) of the appertaining collar shaped portion 624-632, respectively, have cross-sections which are non-circular, i.e. separates from being circular, like a regular or irregular polygon etc.

In FIGS. 5a and 5b, chassis coupler element 610 and collar shaped portion 624 each represents a cross-section shape of cog-wheel-shape, having multiple cogs 640 extending from the cylinder shaped chassis coupler element 610 (at least along a portion of the chassis coupler element which is inserted into the collar shaped portion 624).

Chassis coupler element 611 and collar shaped portion 625 each represents a cross-section shape of a circle with a one protruding portion 641 due to the shape of the chassis coupler element 611 being a cylinder with a bar 641 extending along its long axis (at least along a portion of the chassis coupler element which is inserted into the collar shaped portion 625).

Chassis coupler element 612 and collar shaped portion 626 each represents a cross-section shape which at at least a section of the collar shaped portion forms a circle with a missing portion formed by a pin (protruding portion) 642b, which is protruding into the hollow space of the collar shaped portion 626, which runs in a corresponding recess 642a which extends along the long axis of the cylinder shaped chassis coupler element 612 (at least along a portion of the chassis coupler element which is inserted into the collar shaped portion 626).

Chassis coupler element 613 and collar shaped portion 627 each represents a cross-section shape of a cut circle (extending along at least a portion of the chassis coupler element which is inserted into the collar shaped portion 627).

Chassis coupler element 614 and collar shaped portion 628 each represents a cross-section shape (at some portion of the collar shaped portion and at some portion of the chassis coupler element which is inserted into the collar shaped portion) of a diamond circle, chassis coupler element 615 and collar shaped portion 629 each represents a cross-section shape of a rectangle, chassis coupler element 616 and collar shaped portion 630 each represents a cross-section shape of a square, chassis coupler element 617 and collar shaped portion 631 each represents a cross-section shape of an oval shape, and chassis coupler element 618 and collar shaped portion 632 each represents a cross-section shape of a square with cut corner.

It should be understood that the described embodiments of the invention as described with reference to FIGS. 5a and 5b is a non-exhaustive list different shapes applicable to the present inventive concept and which has a shape separated the shape from a circle and which thus prevents rotation about the long axis of the chassis coupler element.

Figure 4A:
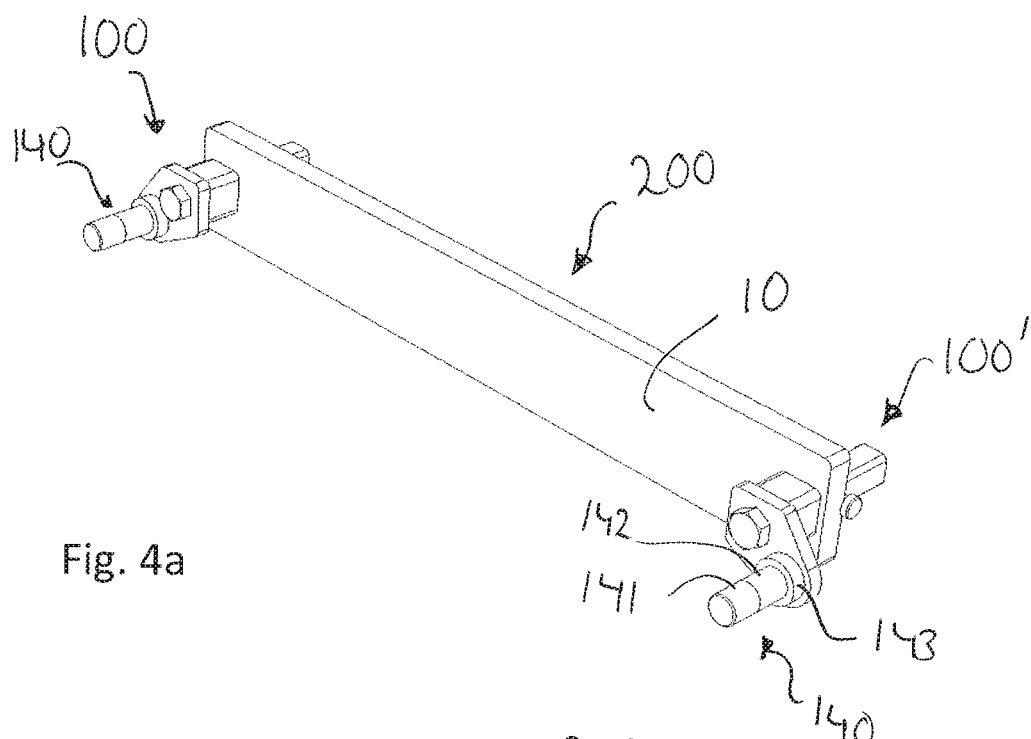
FIG. 4a and FIG. 4b, respectively, are schematic perspective views of two embodiments of an attachment system according to the invention, the latter of which schematically illustrate how two different external components are allowed to connect to an embodiment of an attachment system which comprises a cross-bar.

Referring now to FIG. 4a, an attachment system 200 according to an embodiment of the invention is illustrated in a mounted state when mounted to a chassis (portion) 10. The attachment system 200 comprises two attachment devices 100, 100' according to the exemplifying embodiment of the invention as described with reference to FIGS. 1 and 2, having respective connection elements 140 which are ready to receive an external component or an interconnecting element for attaching an external component.

Figure 4B:
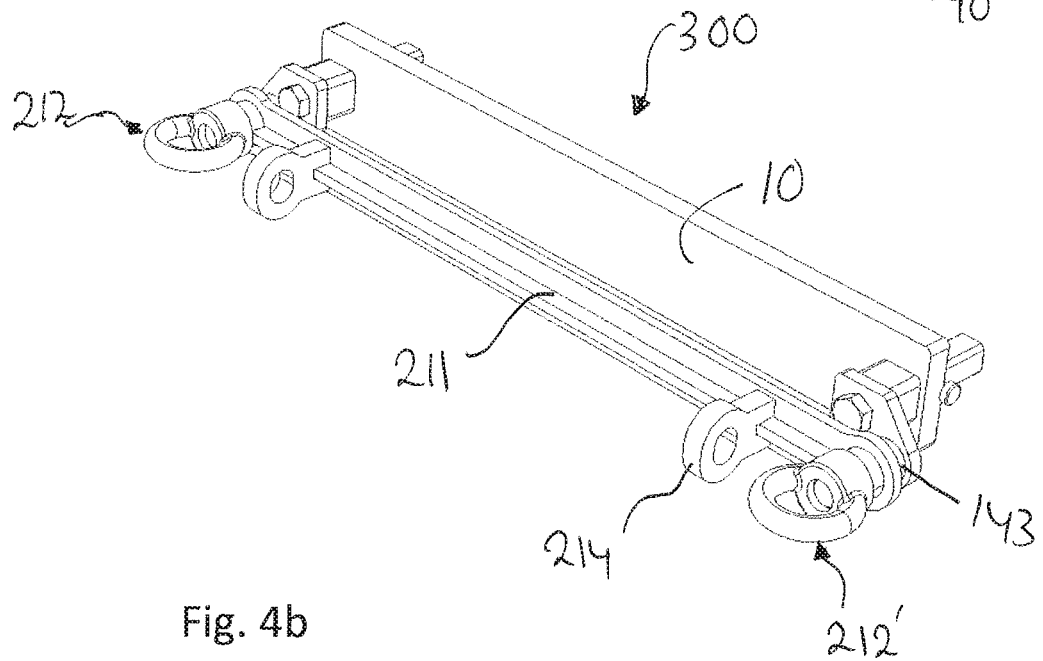

In FIG. 4b, an attachments system 300 is shown in which the two attachment devices 100, 100' are interconnected by means of a cross-bar 211 which in mounted position on a vehicle is arranged to extend horizontally and adapted to be secured to the respective connection elements 140 of the attachment devices 100, 100'. In the shown embodiment, in its outer end portions the crossbar 211 is provided with a respective opening (not visible in FIG. 4b) fitted to be slipped onto the cylinder shaped connection elements 140 and to bear against the support lug 143, see e.g. FIG. 4a, of the connection elements 140. Typically, the cross-bar is adapted to cover the spacing portion 142 of the connection element 140, such that the threaded portion 141 of the connection element 140 protrudes and can be accessed by connector elements 212, 212' which are screwed onto the respective threaded portions 141 of the connection elements 140 to fixate the crossbar. In this embodiment the crossbar is detachably arranged. The connector elements 212, 212' are here two, outwards protruding loop shaped elements which are positioned on the crossbar 211 with a mutual distance adapted to fit corresponding connecting elements of an external component such as e.g. a lifting beam. To continue with the exemplifying embodiment of FIG. 4b, the crossbar 211 further comprises second connector elements 214, which may be adapted to receive a second type of salvaging device. The second salvaging device may be e.g. a lifting beam, which is a typical salvaging device used for towing/hauling of vehicles. Other types of connector elements are conceivable within the present inventive concept, and are typically adapted to the type of external component to attach.

In the exemplifying embodiment described with reference to FIGS. 1-4, the connection element 140 is cylinder shaped and fixated to the support plate 123 at a position which is eccentric with respect to the long axis of the chassis coupler element 110 and the distance element 120. The long axis of the connection element 140 extends parallel to the long axis of the chassis coupler element 110 and the connection element 140 is arranged having a threaded portion 141 at its free end and (optionally) a spacing portion 142 arranged in a center position, and a cylinder shaped support lug 143 arranged directly on the support plate 123. The support lug 143 (which is optional and may have other shapes) has a function of providing a support and stop (at an inner position) for a connection element of the external component or a further part of the attachment system, e.g. the crossbar described above. In the shown example the height of the support lug 143 matches the height of the bolt head 132 to ensure access to the bolt head.

The external component is here connected to the connection element 140 by means of the corresponding complementary connector element 212, which here comprises a hook or eye to connect the external component. In this exemplifying embodiment, the complementary connector element comprises an opening with inner threading which corresponds to the threaded portion 141 such that the connector element can be fastened by screwing it onto the threaded portion 141 of the connection element 140. Other connector elements and combinations of connection elements and connector elements and are applicable and considered to fall within the scope of the invention.

The invention claimed is:

1. An attachment system for providing a rigid attachment of an external component to a chassis of a vehicle, the system comprising:
at least one attachment device comprising:
an elongated chassis coupler element having a first end portion and an opposite second end portion, wherein said elongated chassis coupler element is arranged to be inserted in an opening of said chassis when in a mounted position such that the second end portion protrudes from the opening of the chassis;
a fastening mechanism for fastening the first end portion of the chassis coupler element at the chassis when in a mounted position; and
a clamping device comprising
a distance element including a collar encompassing a hollow space into which the second end portion of the chassis coupler element is receivable, wherein an end face of the collar includes an opening into the hollow space, wherein the end face of the collar is arranged to bear against the chassis when in a mounted position, and
a mechanism for engaging the second end portion of the chassis coupler element and to be operable to control an insertion length of the second end portion into the hollow space,
thereby controlling a clamping force of the collar against the chassis forming a rigid connection between the collar and the chassis when the at least one attachment device is in a mounted position.

2. The attachment system of claim 1, wherein a cross-section of at least a portion of the second end portion and a corresponding cross-section of the hollow space of the distance element are selected to prevent mutual rotation of said chassis coupler element and said distance element about a long axis of the chassis coupler element.

3. The attachment system of claim 1, wherein at least a portion of the first end portion of the chassis coupler element is shaped to fit in the opening of the chassis, and wherein cross-sections of said portion of the first end portion and the opening of the chassis are selected to prevent rotation of said chassis coupler element about a long axis of the chassis coupler element.

4. The attachment system of claim 1, wherein the mechanism for engaging the second end portion of the chassis coupler element includes a screw joint, a bolt joint, or a stud joint.

5. The attachment system of claim 1, wherein the first end portion has a cross-section shape that contains at least one portion that differentiates the cross-section shape from a circle.

6. The attachment system of claim 1, wherein the second end portion has a cross-section shape that is differentiated from the cross-section shape of a circle.

7. The attachment system of claim 1, wherein the fastening mechanism comprises a retainer pin and the chassis coupler element is arranged having an anchor opening.

8. The attachment system of claim 1, wherein the fastening mechanism comprises a key portion arranged on the first end portion.

9. The attachment system of claim 1, further comprising a connection element for interconnecting with the external component.

10. The attachment system of claim 9, wherein the connection element is eccentrically positioned with respect to a long axis of the chassis coupler element.

11. The attachment system of claim 10, wherein said connection element extends from a support plate of the clamping device.

12. The attachment system of claim 9, wherein said connection element extends from a support plate of the clamping device.

13. The attachment system comprising two of the at least one attachment device of claim 1, and further comprising a horizontally elongated crossbar which is arranged for interconnecting the two attachment devices.

14. The attachment system of claim 13 wherein the crossbar is detachably arranged.

15. The attachment system of claim 1, wherein the mechanism for engaging the second end portion of the chassis coupler element is releasably arranged.

16. The attachment system of claim 1, further comprising a support plate, wherein the collar extends from the support plate.

17. The attachment system of claim 1, wherein the mechanism for engaging the second end portion operates through an opening of a support plate.

* * * * *